United States Patent [19]

Brännström et al.

[11] Patent Number: 4,552,529

[45] Date of Patent: Nov. 12, 1985

[54] DEVICE FOR PRESSURE MEASUREMENT IN A PRESSURIZED CONTAINER

[75] Inventors: Roine Brännström; Nils-Erik Söderberg, both of Finspong, Sweden

[73] Assignee: Stal-Laval Turbin AB, Finspong, Sweden

[21] Appl. No.: 542,929

[22] Filed: Oct. 18, 1983

[30] Foreign Application Priority Data

Nov. 1, 1982 [SE] Sweden ............................... 8206195

[51] Int. Cl.⁴ ............................................. F27B 15/00
[52] U.S. Cl. ..................................... 432/58; 431/170; 34/57 A; 110/189; 110/245
[58] Field of Search ..................... 110/245, 229, 189; 431/170; 34/57 A; 432/58

[56] References Cited

U.S. PATENT DOCUMENTS

| | | | |
|---|---|---|---|
| 2,625,386 | 1/1953 | Leone .................................. | 110/189 |
| 3,910,209 | 10/1975 | Albrecht et al. ..................... | 110/189 |
| 4,441,435 | 4/1984 | Miyamoto ............................ | 110/245 |

OTHER PUBLICATIONS

Measurement of Pressure, Fluidized Bed Level and Density in the Synthane Pilot Plant Coal Gasifier, Desmond M. Bailey & O. D. Runnels, Jul. 1977, (17 pages).

Primary Examiner—Henry C. Yuen
Attorney, Agent, or Firm—Pollock, Vande Sande & Priddy

[57] ABSTRACT

To prevent the tube to a pressure measuring means from being blocked by solid material mobile in a pressure container, a small part of the clean pressure medium from a source of such medium is injected into the tube so that the tube is continuously purged with clean pressure medium. By locating the pressure medium input at a suitable position along the tube relative to the pressure measuring means, the desired purging of the tube is obtained without appreciably increasing the pressure in the tube, and thus minimizing possible errors in measurement of the pressure. If, for example, pressure medium is passed into a pressurized combustion chamber through a surrounding pressurized container, and the tube to the pressure-measuring means passes through said surrounding pressurized container, the clean pressure medium can be bled into the tube through a hole bored in the side of the tube within the pressurized container.

3 Claims, 4 Drawing Figures

DEVICE FOR PRESSURE MEASUREMENT IN A PRESSURIZED CONTAINER

BACKGROUND OF THE INVENTION

1. Field of the Invention

The present invention relates to a device for sensing the pressure in a pressurized container containing a pressure medium mixed with a solid particulate material or liquid droplets which could block the tube means through which the pressure sensing is effected.

If the pressure in a container is to be sensed (e.g. measured), a pressure measuring means is normally connected to the container, often by means of a conduit which may in certain cases be long and which it is normally desired to maintain of rather narrow bore. If then the pressure medium in the container—it may be a fluid or a gas or air—is mixed with fine particles of foreign matter, for example dust or sludge, there is a constant risk of these particles entering the conduit to the pressure measuring means and blocking it. This will jeopardize the result of the measurement.

2. Description of the Prior Art

In certain cases entry of foreign matter into the conduit can be prevented by filters or traps which, however, are not always satisfactory, especially not if the pressure medium and its entrained particles are in powerful motion or have a high temperature. Another prior art method employs a continuous or regular purging of the conduit leading to the pressure measuring means. In this case, some suitable blowing agent is used for the purging, which is supplied to the plant using a special system. The systems proposed so far, however, have not proved to be satisfactory. During continuous purging, an error in pressure measurement occurs because of the pressure increase in the tube from the blowing agent, whereas periodic blowing may be unreliable. In both cases, the prior art systems are complicated and expensive.

SUMMARY OF THE INVENTION

The present invention is based on a continuous purging of the conduit leading to the pressure-sensing means, but instead of constructing a complicated system to avoid errors in measurement, clean pressure medium used in the plant is simply withdrawn at a suitable place and injected into the conduit leading to the pressure-sensing means at a suitable place.

The invention is therefore particularly useful where a clean pressure medium is supplied to a pressure container from a pressure source, whereas the particulate material is supplied in a different way. Such is the case, for example, in a fluidized bed combustion chamber which operates under pressure, or in a transport system for air-borne or liquid-borne conveyance of solid particulate material. In such cases the application of the invention is often exceedingly simple.

BRIEF DESCRIPTION OF DRAWINGS

The invention will now be described in greater detail, by way of example, with reference to the accompanying drawings, in which:

FIG. 1 shows in schematic outline the inventive principle, whereas

DESCRIPTION OF PREFERRED EMBODIMENTS

Figure 1:
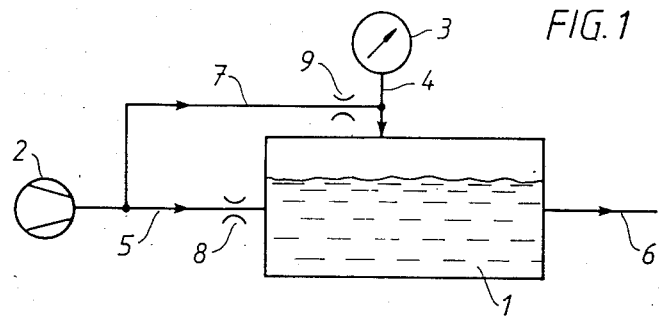

FIG. 1 shows an outline diagram showing a pressurized container 1 which is fed with pressure medium from a pump or compressor 2 through a conduit 5. The pressure in the container is measured by a pressure measuring device 3 in the form of a manometer, or the like, connected to the container 1 through a tube 4 which normally has a relatively small bore. In addition to pressure medium, the container also contains solid particulate material in the form of dust, powder or sludge. From the container 1 a conduit 6 carries away medium and material which have been processed or reacted in the container.

To prevent the solid material from being thrown up into the tube 4 and clogging its bore, thereby affecting the accuracy of the measuring device 3, or even putting it out of operation, pressure medium is withdrawn from the conduit 5 through a conduit 7 and is supplied to the tube 4 at a certain distance from the container 1. The conduit 7 is connected to the conduit 5 at such a position that the medium, which is supplied to the tube 4 through the conduit 7, is at a higher pressure than that existing in the container 1. On the other hand, the pressure of the thus-supplied medium should not exceed the precise pressure required to keep solid material from entering the orifice of the tube 4. Operating in this way ensures that any measurement error resulting from the supply of medium to the tube 4 can be maintained within reasonable limits. It is possible to determine, by simple experiment, what the measurement error is at different pressures. It is also possible empirically to determine the optimum locations for the ends of the conduit 7 with the conduit 5 and the tube 4 to give the desired flow rate of medium through the conduit 7. The throttle means 8, shown in FIG. 1, on the conduit 5 should be regarded as symbolic of the inherent resistance to flow of the conduit 5, whereas the throttle means 9 shown on conduit 7 indicates that the dimensioning and location of the conduit 7 should be selected with due regard to the pressure in, and flow rate through, the conduit 5. Similarly, the distance along the tube 4 from its connection with the conduit 7 to the container 1 should be chosen in such a way that dust or sludge is safely prevented from entering the tube 4. Experiments indicate that this distance should be about 20 times the diameter of the bore of the tube 4.

It will be apparent that the purging effect of the conduit 7 will cease if the pump or compressor 2 is stopped. However, in practice this is not a limitation, since normally when the pump or compressor stops, the medium and the material in the container begin to settle down, thus reducing the risk of clogging of the tube 4.

Figure 2:
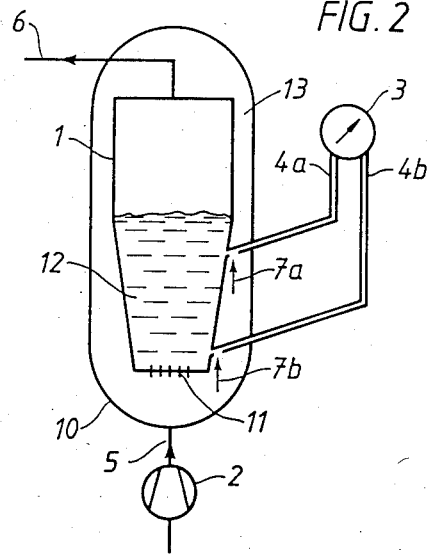
FIGS. 2 to 4 show different examples of the application of the invention.
Figure 3:
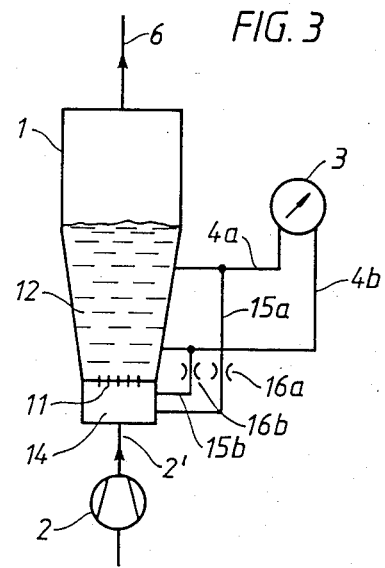
Figure 4:
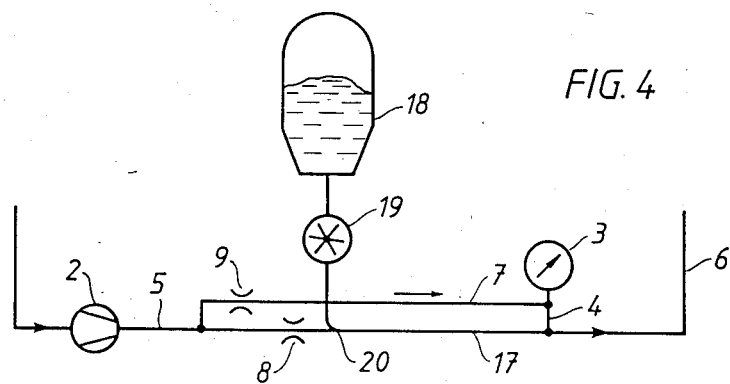

To facilitate an understanding of FIGS. 2, 3 and 4, the same reference numerals used in FIG. 1 have been used in these Figures to designate the same or equivalent components.

FIG. 2 shows a first example of a practical application of the invention. This figure shows a fluidized bed combustion chamber 1 which, from a compressor 2, receives combustion air under pressure through a conduit 5, via a pressure vessel 10 surrounding the combustion chamber 1, the pressure vessel 10 thus corresponding to part of the conduit 5 as shown in FIG. 1. The compressed air enters the lower portion of the combustion chamber 1 through a perforated bottom 11, which will thus correspond to the throttle means 8 shown in FIG. 1. The flue gases from the combustion chamber 1 are led away through an exhaust tube 6. A pressure measuring device 3, in this case designed to measure both the total pressure and the pressure drop in the fluidized bed 12 of the combustion chamber 1, is connected to the combustion chamber 1 by means of two tubes 4a and 4b. These tubes 4a, 4b pass through a space 13 between the pressure vessel 10 and the combustion chamber 1, and to keep the bores of the tubes 4a, 4b open, holes 7a and 7b have been drilled in the side of the tubes in the region of the space 13 so that compressed air from the pressure vessel 10 is blown into the bed 12 via the lower part of each tube 4a and 4b. These holes 7a and 7b have been marked by arrows since it will be seen they correspond to the tube 7 in FIG. 1 and the size of each hole 7a or 7b determines the volume of air which will flow through them into the bed 12. The holes 7a and 7b thus also control the throttle means 9 shown in FIG. 1. The size of the holes as well as their distance from the combustion chamber 1 can be chosen so as to obtain an adequate purging of the tubes 4a and 4b to prevent blocking thereof, without introducing an unacceptably large measurement error. It will be seen, therefore, that the application of the invention in this case is extremely simple.

FIG. 3 shows the invention applied to a plant having a fluidized bed combustion chamber 1 operating at close to atmospheric pressure. A compressor 2 feeds a plenum chamber 14 below a perforated bottom 11 in the chamber 1 and sustains a fluidized bed 12 in the combustion chamber 1. Connecting tubes 4a and 4b of a pressure-measuring device 3 communicate, via two connecting tubes 15a and 15b with the plenum chamber 14. 16a and 16b represent the throttling means experienced by air bypassing the bottom 11 and entering the bed 12 via the lower ends of the tubes 4a and 4b to keep their bores free of sediment. As in the arrangement previously discussed with reference to FIG. 2, the throttling means 16a and 16b are selected on the one hand to provide an adequate air flow into the bed 12 to prevent blocking of the tubes 4a and 4b and on the other hand to keep the pressure measurement error introduced by the flow in the tubes 4a and 4b to an acceptable level. The throttling means 16a and 16b can be inherent in the dimensions of the tubes 15a and 15b selected or can be applied to those tubes in any convenient manner as required. Ensuring that the tubes 15a and 15b would, unthrottled, give more air than is required and empirically adjusting flow rate valves in each tube 15a and 15b would be one easy solution to the setting of the throttling means 16a and 16b. In any event it will be appreciated that in the FIG. 3 embodiment blockage prevention in the connecting tubes 4a, 4b is again achieved by extremely simple means.

FIG. 4 shows another application of the invention, this time in the case of a plant for the pressure medium transport of solid material, for example the compressed-air transportation of crushed solid fuel.

In the FIG. 4 example, the pressurized container 1 is now constituted by a tube 17 through which the transport of solid material takes place. The solid material comes from a container 18 and is fed forward to the tube 17 with the aid of, for example, a rotary feeder 19. A conduit 5 from a compressor 2 extends to a point 20 where the solid material is fed in to the upstream end of the tube 17 which continues to a discharge tube 6. With the aid of a pressure-measuring device 3 and its connection tube 4 (which could be several connection tubes) the pressure in the tube 17 can be measured at at least one point. With the aid of a tube 7, pressure medium is bled from the conduit 5 and supplied to the tube 4. In FIG. 4 also, throttle means 8 and 9 have been shown to symbolize dimensions and resistances in the tubes 5 and 7, which as discussed previously are real or inherent throttling means to ensure the correct flow rate through the tube(s) 4.

As will be clear from the preceding discussion, it is in practice quite simple to determine how the conduit 7, or its equivalent, should be installed or designed. In a number of cases simple consideration of the drawings of a plant or projected plant will indicate an obvious arrangement which would achieve the desired ends.

Finally it should be appreciated that the foregoing has discussed only some of the many possible applications of the invention and that all other arrangements incorporating modifications of the embodiments discussed falling within the scope of the following claims represent aspects of the invention.

What is claimed is:

1. A pressurized fluidized bed combustion plant comprising:
   a first container for containing a particulate mobile material;
   a second container surrounding said first container;
   means for feeding pressurized air to a space formed between said first container and said second container;
   means for introducing said pressurized air into said first container so as to fluidize said particulate material;
   sensing means connected to said first container by a tube means passing through said space between said first and second containers; and,
   a bleeding means connected to said tube means for bleeding a portion of said pressurized air from said space to said first container via said tube means, said bleeding means being dimensioned and located relative to said space and said tube means so that the flow rate of said bleed portion is sufficient to prevent said particulate material from blocking said tube means but insufficient to prevent a sensing of the pressure in said first container by said sensing means.

2. A plant according to claim 1 in which said bleeding means is a hole in the wall of the tube means.

3. A plant according to claim 2, in which the hole in the tube means is located at a distance from said first container of the order of magnitude of 20 times the inside diameter of the tube means.

* * * * *